(12) United States Patent
Hayashi et al.

(10) Patent No.: US 11,697,169 B2
(45) Date of Patent: Jul. 11, 2023

(54) SOLDERING DEVICE AND CONTROL METHOD FOR SOLDERING DEVICE

(71) Applicants: DENSO TEN Limited, Kobe (JP); Senju System Technology Co., Ltd., Toyama (JP)

(72) Inventors: Hisaki Hayashi, Kobe (JP); Yasuyuki Watanabe, Kobe (JP); Noboru Hashimoto, Toyama (JP)

(73) Assignees: DENSO TEN Limited, Kobe (JP); SENJU SYSTEM TECHNOLOGY CO., LTD., Toyama (JP)

( * ) Notice: Subject to any disclaimer, the term of this patent is extended or adjusted under 35 U.S.C. 154(b) by 335 days.

(21) Appl. No.: 16/904,918

(22) Filed: Jun. 18, 2020

(65) Prior Publication Data

US 2020/0398359 A1 Dec. 24, 2020

(30) Foreign Application Priority Data

Jun. 19, 2019 (JP) .................................. 2019-113901

(51) Int. Cl.
*B23K 3/06* (2006.01)
*B23K 3/08* (2006.01)
*G05B 15/02* (2006.01)

(52) U.S. Cl.
CPC .............. *B23K 3/0653* (2013.01); *B23K 3/08* (2013.01); *G05B 15/02* (2013.01)

(58) Field of Classification Search
CPC ....................................................... B23K 3/06
See application file for complete search history.

(56) References Cited

U.S. PATENT DOCUMENTS

| | | | | |
|---|---|---|---|---|
| 5,176,307 A * | 1/1993 | Hagerty | ............... | H05K 3/3468 118/DIG. 7 |
| 5,320,274 A * | 6/1994 | Precious | ................. | B23K 1/008 228/180.1 |
| 5,411,200 A * | 5/1995 | Connors | ............... | B23K 3/0653 228/42 |
| 6,705,506 B1 * | 3/2004 | Sund | ..................... | B23K 3/0669 228/56.1 |
| 8,328,067 B2 * | 12/2012 | Yanaros | ............... | B23K 1/0016 228/8 |
| 8,328,069 B2 * | 12/2012 | Isler | ........................ | B23K 1/085 228/256 |
| 2014/0027495 A1 * | 1/2014 | Arslanian | ............ | B23K 3/0653 228/37 |

(Continued)

FOREIGN PATENT DOCUMENTS

| | | |
|---|---|---|
| CN | 104718044 A | 6/2015 |
| DE | 101 50 495 A1 | 4/2003 |
| JP | 2002-305372 A | 10/2002 |

(Continued)

*Primary Examiner* — Devang R Patel
(74) *Attorney, Agent, or Firm* — Oliff PLC

(57) ABSTRACT

A soldering device according to an embodiment includes a jet nozzle and a cover. The jet nozzle jets a molten solder. The cover is filled with an inert gas in an inside thereof and has a hole part at a position that corresponds to the jet nozzle. The cover causes the jet nozzle to protrude from the hole part for an application time period when the solder is applied to an application target and houses the jet nozzle in the inside thereof for a waiting time period other than the application time period.

4 Claims, 9 Drawing Sheets

(56) References Cited

U.S. PATENT DOCUMENTS

2015/0336194 A1    11/2015  Colijn
2018/0229322 A1*  8/2018  Hayashi ............... B23K 3/0653

FOREIGN PATENT DOCUMENTS

| JP | 2006-165235 A | 6/2006 | | |
|---|---|---|---|---|
| JP | 2010-267785 A | 11/2010 | | |
| WO | WO-2014199694 A1 | * | 12/2014 | ........... B23K 1/0016 |

* cited by examiner

FIFTH STEP

SIXTH STEP

SOLDERING DEVICE AND CONTROL METHOD FOR SOLDERING DEVICE

CROSS-REFERENCE TO RELATED APPLICATION(S)

This application is based upon, and claims the benefit of priority to, Japanese Patent Application No. 2019-113901 filed on Jun. 19, 2019, the entire contents of which are herein incorporated by reference.

FIELD

An aspect of an embodiment relates to a soldering device and a control method for a soldering device.

BACKGROUND

A soldering device has conventionally been provided that pressure-feeds a molten solder to a jet nozzle to solder an electronic component on a printed circuit board through a pallet that is provided at a tip of the jet nozzle.

Furthermore, in such a soldering device, a technique is provided that includes a fixed-type cover that covers a solder bath in a state where a tip of a jet nozzle is caused to protrude and fills an inside of the cover with an inert gas to provide a low-oxygen environment in the inside of the cover and thereby reduce oxidation of a solder (see, for example, Japanese Patent Application Publication No. 2010-267785).

However, in a conventional technique, a tip of a jet nozzle is fixed in a state where it is not covered by a cover, so that the tip of the jet nozzle is constantly placed in an atmospheric environment and oxidation of a jetted solder is accelerated. Hence, in a case where a solder after jetting is recovered by a solder bath and used repeatedly, oxidation of a solder that is stored in the solder bath may be accelerated.

SUMMARY

According to an aspect of an embodiment, a soldering device includes a jet nozzle and a cover. The jet nozzle jets a molten solder. The cover is filled with an inert gas in an inside thereof and has a hole part at a position that corresponds to the jet nozzle. The cover causes the jet nozzle to protrude from the hole part for an application time period when the solder is applied to an application target and houses the jet nozzle in the inside thereof for a waiting time period other than the application time period.

DESCRIPTION OF EMBODIMENTS

Hereinafter, a soldering device and a control method for a soldering device according to an embodiment(s) will be explained in detail with reference to the accompanying drawings. Additionally, this invention is not limited by an embodiment(s) as illustrated below.

Figure 1:
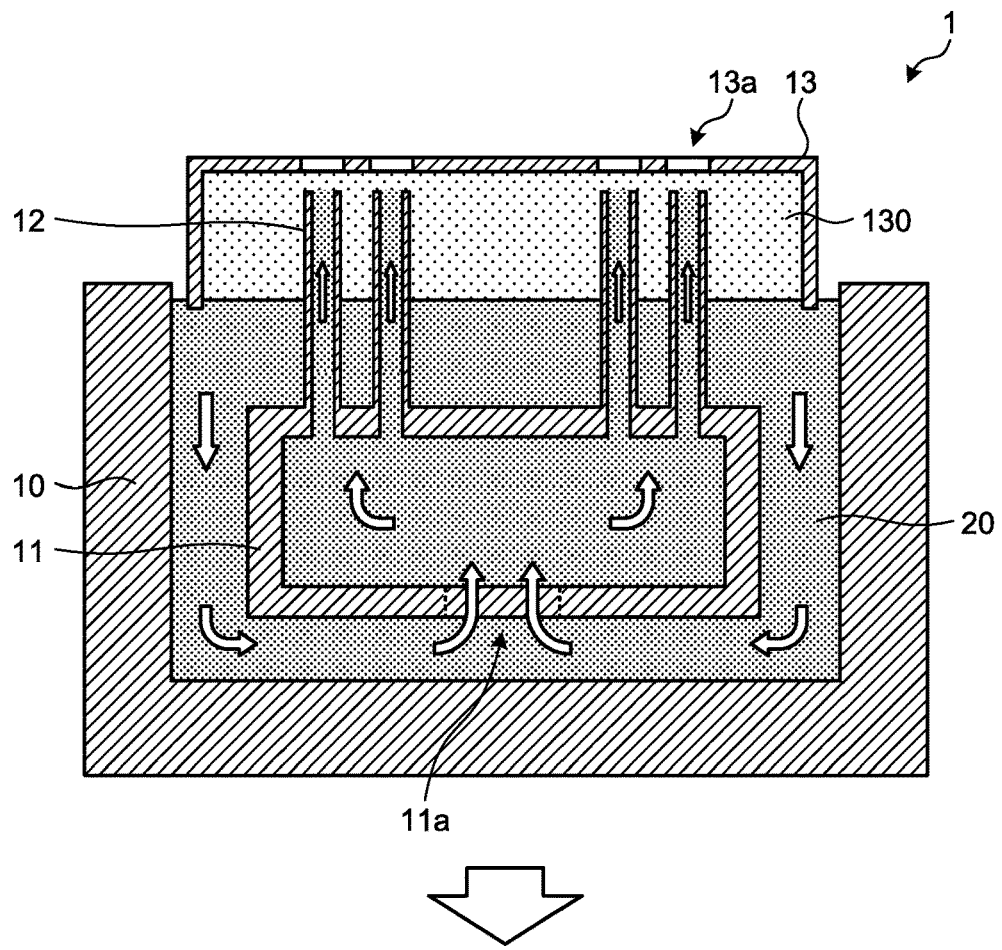
FIG. 1 is a diagram that illustrates an outline of a control method for a soldering device according to an embodiment.
Figure 1:
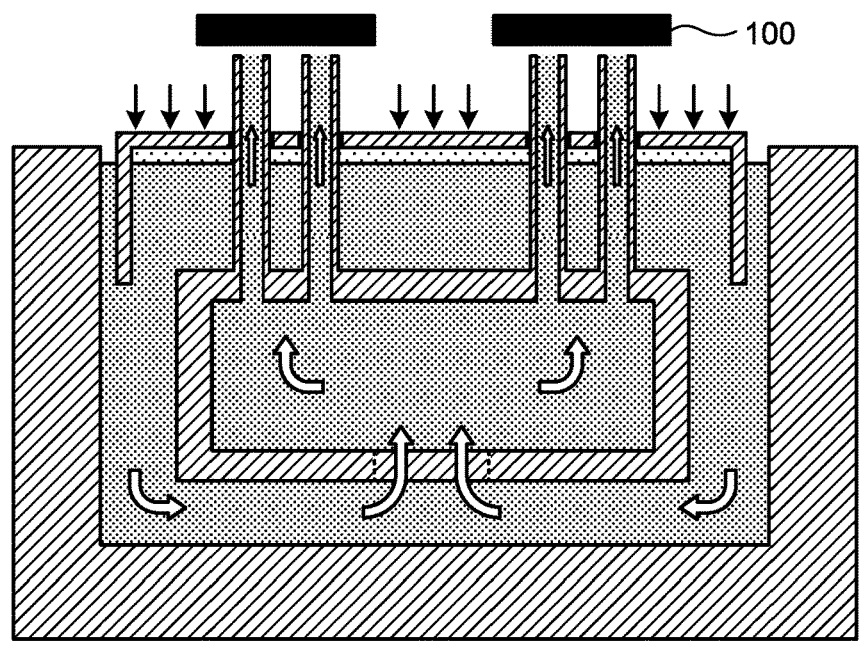

First, an outline of a control method for a soldering device according to an embodiment will be explained by using FIG. 1. FIG. 1 is a diagram that illustrates an outline of a control method for a soldering device according to an embodiment. Additionally, FIG. 1 illustrates a schematic cross section of a soldering device.

A soldering device 1 according to an embodiment is a so-called nozzle-flow-type soldering device that jets, from a jet nozzle 12, a solder that is stored in a solder bath, so that soldering is locally executed on a circuit board.

As illustrated in FIG. 1, the soldering device 1 according to an embodiment includes a solder bath 10, a casing part 11, the jet nozzle 12, and a cover 13.

The solder bath 10 stores a molten solder 20. The solder bath 10 includes, for example, a non-illustrated heater where a solder in the solder bath 10 is heated by heat of such a heater to provide the molten solder 20 and a temperature of the molten solder 20 is maintained at a temperature that is suitable for soldering.

The casing part 11 is provided in the solder bath 10. The casing part 11 sucks up, by a non-illustrated pump, the molten solder 20 in the solder bath 10 from a suction hole 11a that is provided on a bottom surface thereof, as indicated by an outlined arrow in FIG. 1, and pressure-feeds the sucked molten solder 20 to the jet nozzle 12.

The jet nozzle 12 jets, vertically upward, the molten solder 20 that is pressure-fed from the casing part 11. Thereby, the molten solder 20 that is jetted from the jet nozzle 12 is applied to each connection site of a printed circuit board 100 that is an application target, so that soldering is executed.

Furthermore, the jet nozzle 12 is of a non-illustrated two-layer pipe structure. Then, among two layers, an inner layer is a layer where the molten solder 20 that is pressure-fed from the casing part 11 passes and an outer layer is a layer for recovering, and returning to the solder bath 10, the molten solder 20 that is not attached to the printed circuit board 100.

The cover 13 a protective member that covers the solder bath 10 to prevent oxidation of the molten solder 20 that is stored in the solder bath 10. An inside 130 of the cover 13 is filled with, for example, an inert gas such as nitrogen.

Thereby, a liquid level of the molten solder 20 in the solder bath 10 is provided in a low-oxygen environment, so that it is possible to prevent oxidation of the molten solder 20 that is stored in the solder bath 10. Additionally, the cover 13 has a hole part 13a at a position that corresponds to the jet nozzle 12 and causes the jet nozzle 12 to protrude from such a hole part 13a, where such a point will be described later.

Herein, a conventional cover is of a fixed type and is fixed to cover a solder bath in a state where a tip of a jet nozzle protrudes. Hence, a tip of a jet nozzle is constantly placed in an atmospheric environment, so that oxidation of a jetted solder is accelerated.

Therefore, for example, in a case where a solder after jetting is recovered by a solder bath and used repeatedly, oxidation of a solder that is stored in the solder bath may be accelerated conventionally.

Hence, in the soldering device 1 according to an embodiment, the cover 13 is of a movable type.

Specifically, in a control method for the soldering device 1 according to an embodiment, the jet nozzle 12 protrudes from the hole part 13a for an application time period when the molten solder 20 is applied to the printed circuit board 100 that is an application target and the jet nozzle 12 is housed in the inside 130 for a waiting time period other than the application time period.

A control method for the soldering device 1 according to an embodiment will be explained in detail while FIG. 1 is provided as an example. An upper section of FIG. 1 illustrates a position of the cover 13 for a waiting time period and a lower section of FIG. 1 illustrates a position of the cover 13 for an application time period.

Additionally, a commencement of an application time period (a termination of a waiting time period) is a timing when the printed circuit board 100 is conveyed to a position where it is possible to apply the molten solder 20, and a termination of the application time period (a commencement of the waiting time period) is a timing when the printed circuit board 100 where the molten solder 20 is applied is conveyed.

As illustrated in an upper section of FIG. 1, in a control method for the soldering device 1 according to an embodiment, a whole of the jet nozzle 12 is housed in the inside 130 of the cover 13 for a waiting time period. Additionally, for a waiting time period, the inside 130 of the cover 13 is kept at a positive pressure state by an inert gas. Thereby, a tip of the jet nozzle 12 is covered by an inert gas to be provided in a low-oxygen state.

Then, as illustrated in a lower section of FIG. 1, in a control method for the soldering device 1 according to an embodiment, for an application time period, the cover 13 is moved vertically downward, so that a tip of the jet nozzle 12 protrudes from the hole part 13a. Then, the molten solder 20 that is jetted from the jet nozzle 12 in a state where it protrudes from the cover 13 is applied to the printed circuit board 100.

Thus, in a control method for the soldering device 1 according to an embodiment, the jet nozzle 12 is caused to protrude only for an application time period and the jet nozzle 12 is housed in the inside 130 for a waiting time period, so that a time period when a tip of the jet nozzle 12 is placed in an atmospheric environment is kept to a minimum. Therefore, in a control method for the soldering device 1 according to an embodiment, it is possible to reduce oxidation of a solder.

Additionally, the printed circuit board 100 is conveyed in a state where it is housed in an inside of a pallet (an example of a conveyance body) and the inside of the pallet and the inside 130 of the cover 13 are joined through the hole part 13a for an application time period, although a detail thereof will be described later.

Therefore, a tip of the jet nozzle 12 that protrudes from the cover 13 is positioned in an inside of a pallet and kept in a low-oxygen state, so that it is possible to reduce oxidation of the molten solder 20 to a minimum even for an application time period.

Figure 2:
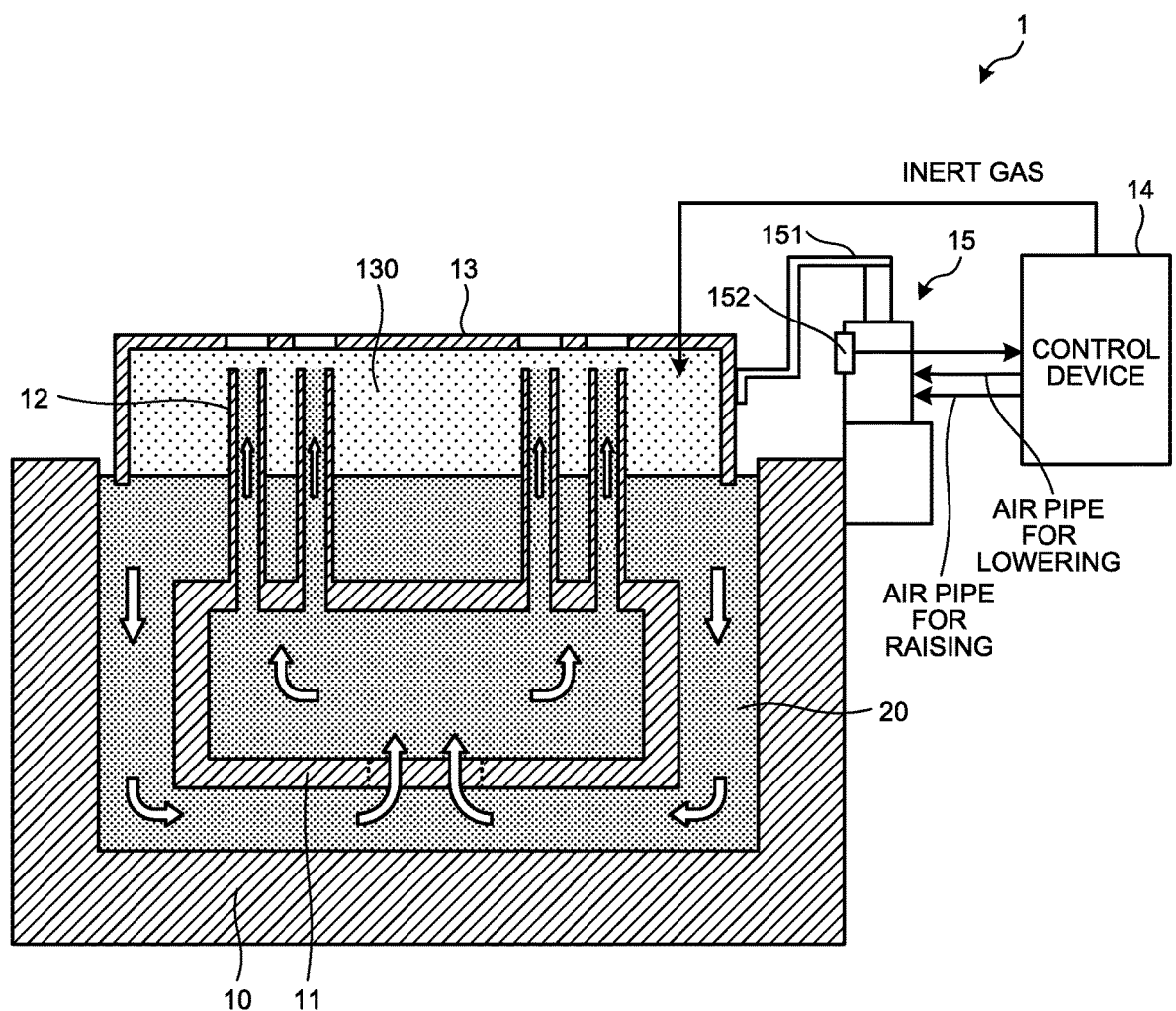
FIG. 2 is a diagram that illustrates a configuration of a soldering device according to an embodiment.

Next, a configuration of a soldering device 1 according to an embodiment will be explained in detail by using FIG. 2. FIG. 2 is a diagram that illustrates a configuration of the soldering device 1 according to an embodiment.

As illustrated in FIG. 2, the soldering device 1 according to an embodiment includes a solder bath 10, a casing part 11, a jet nozzle 12, a cover 13, a control device 14, and an air cylinder 15.

The air cylinder 15 includes a supporting part 151 that supports the cover 13 and a detection part 152 that detects a raising or lowering position (a height position) of the cover 13. The detection part 152 detects, and notifies the control device 14 of, a raising position and a lowering position of the cover 13.

Additionally, for the detection part 152, it is possible to use a sensor that detects a position of a piston of the air cylinder 15. Thereby, a sensor that detects a raising or lowering position of the cover 13 does not have to be provided separately, so that it is possible to reduce a cost.

Furthermore, the air cylinder 15 is a pressing part that presses the cover 13. Specifically, in a case where contact between a pallet and the covet 13 is caused for an application time period, the air cylinder 15 presses the cover 13 against the pallet and raises or lowers the cover 13 depending on a magnitude of a pressing force (an air pressure) thereof.

Furthermore, an air pressure of the air cylinder 15 that is associated with a pressing force of the cover 13 is controlled by the control device 14. Additionally, a detail of a raising or lowering operation of the cover 13 by the air cylinder 15 will be described later.

Thus, the air cylinder 15 is used to execute a raising or lowering operation of the cover 13, where, for example, even in a case where aging degradation is caused to change a pressing force of the cover 13, an air pressure is adjusted, so that it is possible to correct an influence of such aging degradation.

Additionally, the air cylinder 15 is an example of a pressing part. For example, a spring (a spring member) may be used instead of the air cylinder 15 or in combination with the air cylinder 15.

The control device 14 includes a computer that has, for example, a Central Processing Unit (CPU), a Read Only Memory (ROM), a Random Access Memory (RAM), Data Flash, an input/output port, and the like, and various types of circuits.

A CPU of a computer reads and executes a program that is stored in, for example, a ROM to execute each function.

Furthermore, it is also possible to configure a part or all of the control device 14 by hardware such an Application Specific Integrated Circuit (ASIC) or a Field Programmable Gate Array (FPGA).

Furthermore, it is possible for a RAM or Data Flash to store information of various types of programs such as a program for executing a control process according to a control method as described above, or the like. Additionally, the control device 14 may acquire a program as described above or various types of information through another computer that is connected by a wired or wireless network or a portable recording medium.

The control device 14 controls an amount of an inert gas that is supplied to the inside 130 of the cover 13. Specifically, the control device 14 controls a non-illustrated regulator that is provided on a flow channel to supply an inert gas, so that an air pressure of the inert gas is adjusted to control a supplied amount thereof. Additionally, a detail of control of supply of an inert gas will be described later in FIG. 3 and the subsequent figures.

Furthermore, the control device 14 controls an operation of the air cylinder 15 to raise, lower, or move the cover 13. Specifically, the control device 14 connects an air pipe for lowering to lower the cover 13 and an air pipe for raising to raise the cover 13 to the air cylinder 15.

For example, the control device 14 supplies air with an air pressure that is less than a pressurizing force of a pallet against the cover 13, to the air cylinder 15 through an air pipe for lowering. Thereby, a pressing force (a reaction force) of the cover 13 against a pallet is less than a pressurizing force of the pallet, so that the cover 13 is pressurized by the pallet and lowered.

Furthermore, the control device 14 supplies air with an air pressure that is greater than a pressurizing force of a pallet against the cover 13 to the air cylinder 15 through an air pipe for raising. Thereby, a pressing force (a reaction force) of the cover 13 against a pallet is greater than a pressurizing force of the pallet, so that the cover 13 pressurizes the pallet and is raised.

More specifically, the control device 14 includes a non-illustrated pressure sensor and electropneumatic regulator on an air pipe for raising. In such a case, the control device 14 controls an electropneumatic regulator to control an air pressure, monitors an air pressure of air that is output from the electropneumatic regulator by a pressure sensor, and executes feedback control of the electropneumatic regulator so as to provide a target air pressure.

Figure 3:
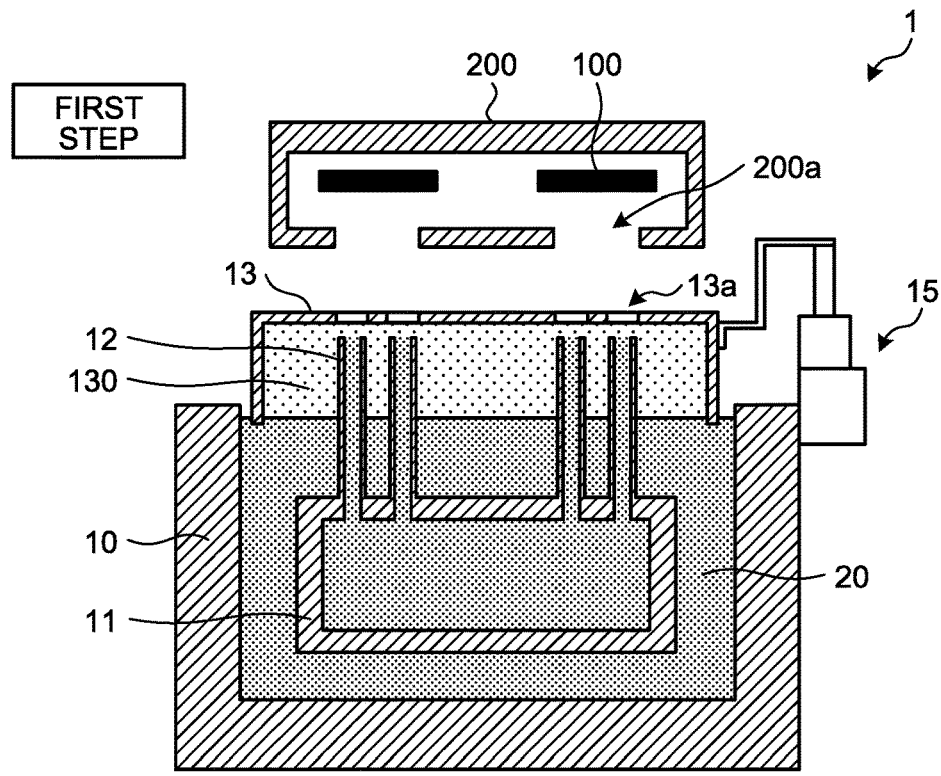
FIG. 3 is a diagram that illustrates operation steps of a soldering device according to an embodiment.
Figure 3:
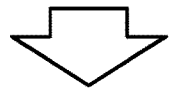
Figure 3:
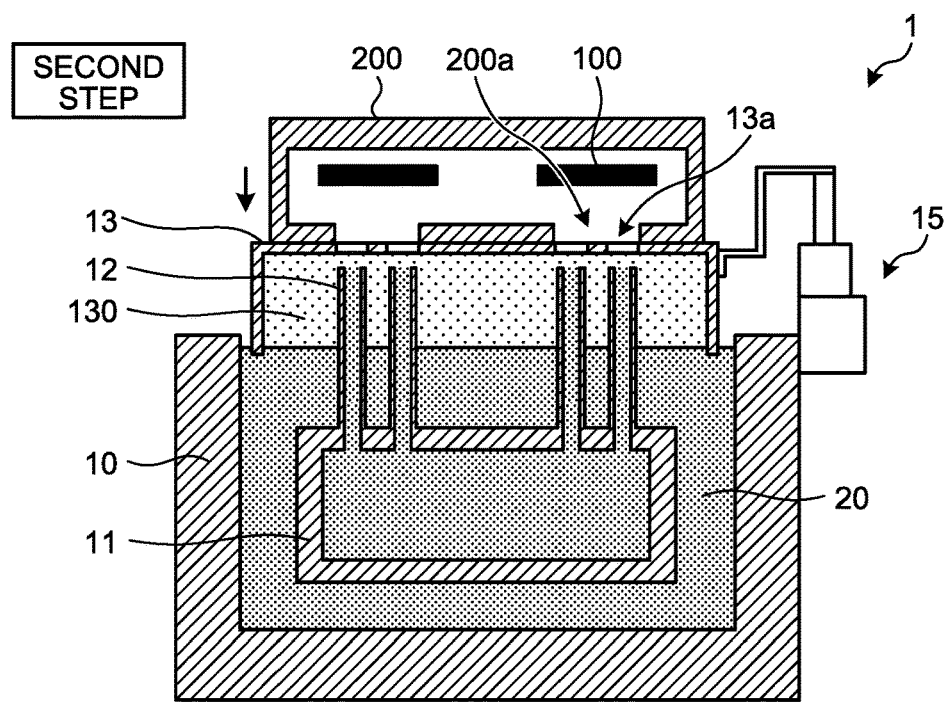
Figure 4:
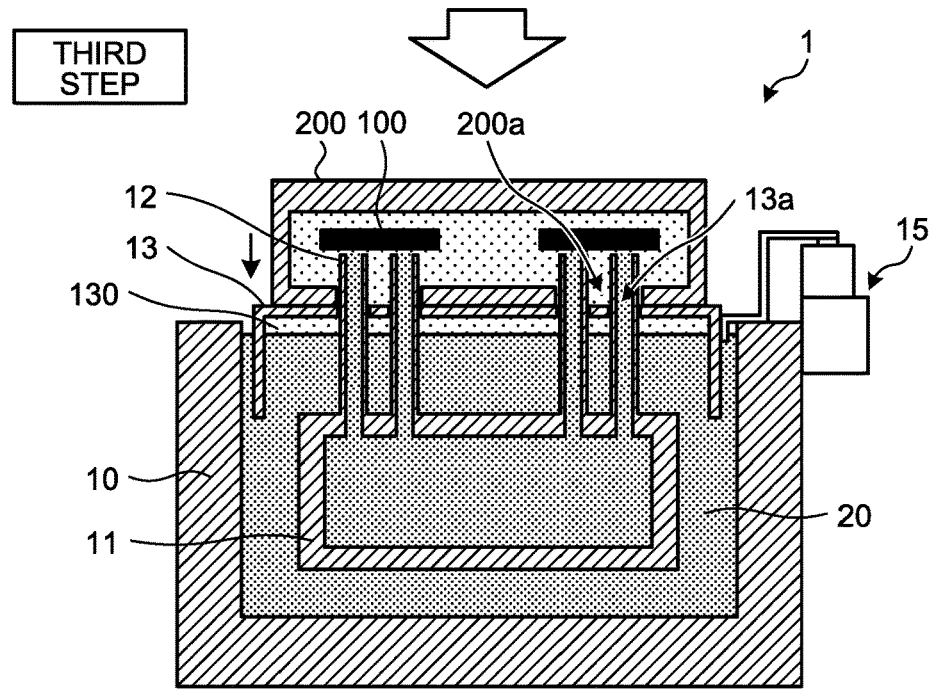
FIG. 4 is a diagram that illustrates operation steps of a soldering device according to an embodiment.
Figure 4:
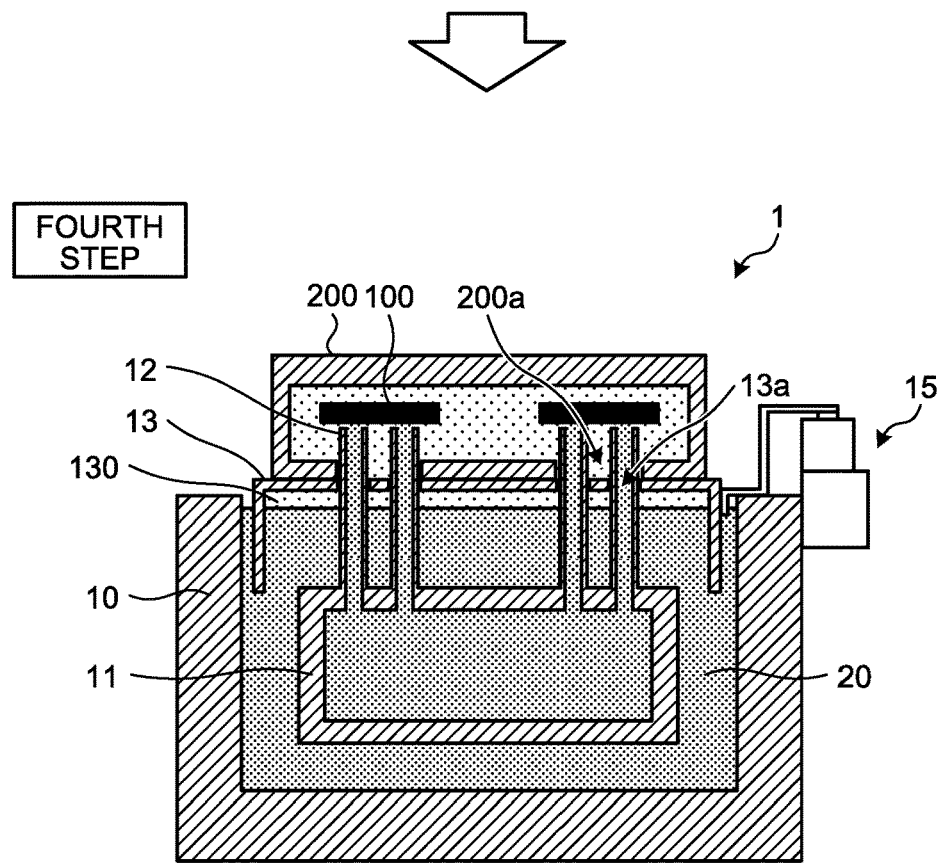
Figure 5:
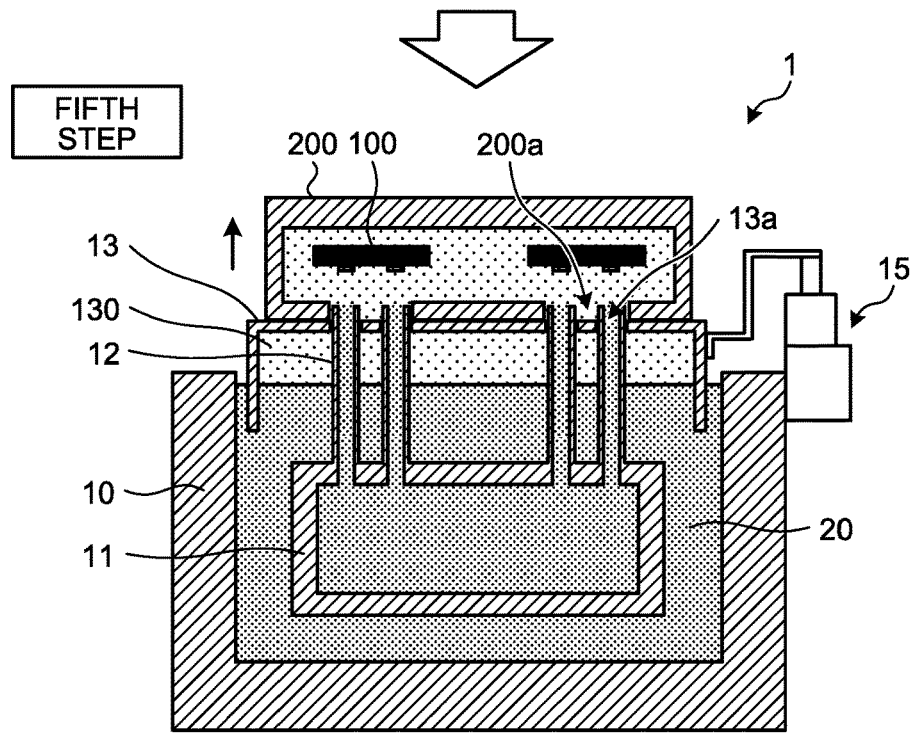
FIG. 5 is a diagram that illustrates operation steps of a soldering device according to an embodiment.
Figure 5:
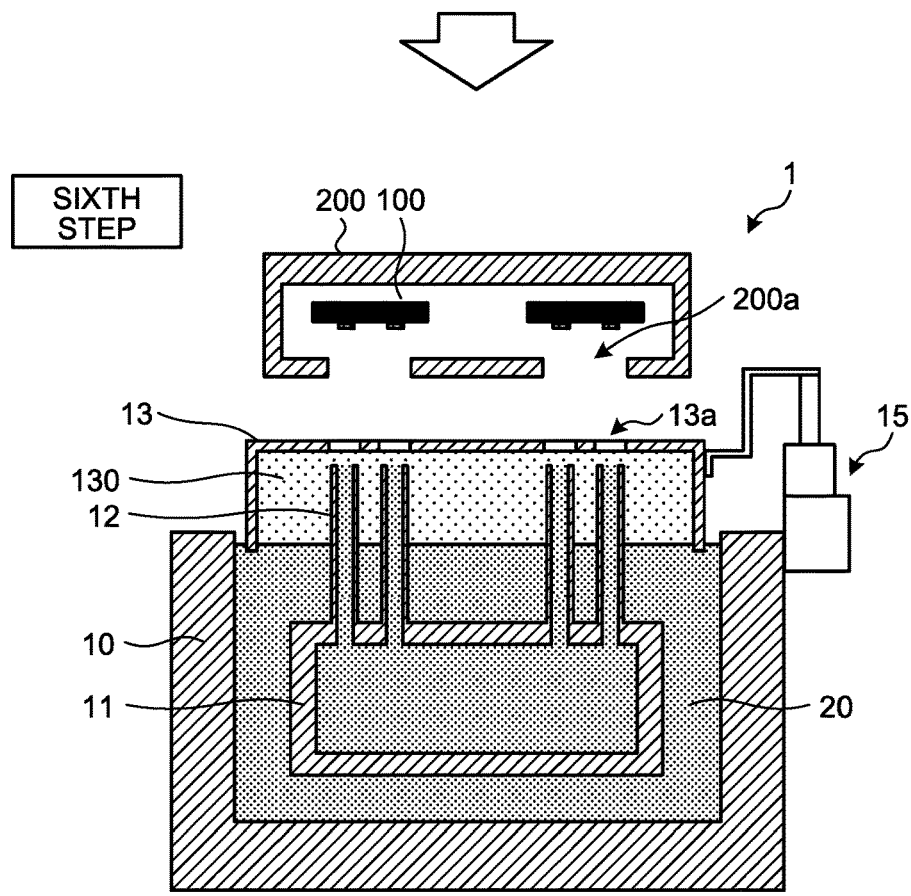

Next, operation steps of a soldering device 1 according to an embodiment will be explained by using FIG. 3 to FIG. 5. FIG. 3 to FIG. 5 are diagrams that illustrate operation steps of the soldering device 1 according to an embodiment. Hereinafter, operation steps from a first step to a sixth step as illustrated in FIG. 3 to FIG. 5 will be explained sequentially.

First Step

First, in a first step as illustrated in an upper section of FIG. 3, a pallet 200 that houses a printed circuit board 100 is provided in a process of conveyance and does not reach a position where it is possible to apply a molten solder 20. That is, the first step is a waiting time period for the soldering device 1. In such a case, the soldering device 1 provides a cover 13 at a raising position to house a jet nozzle 12 in an inside 130 thereof.

Furthermore, in the first step, a control device 14 of the soldering device 1 supplies an inert gas in a supplied amount where the inside 130 of the cover 13 is provided in a positive pressure state. That is, the inside 130 of the cover 13 is provided in a positive pressure state by an inert gas for a waiting time period.

Thereby, it is possible to reduce an inflow of air from a hole part 13*a* of the cover 13. Furthermore, the inside 130 of the cover 13 is provided in a positive pressure state, so that it is possible to provide an opening state without providing a complex opening and closing mechanism on the hole part 13*a* and hence it is possible to reduce a cost of the cover 13.

Second Step

Transfer to a second step is executed. As illustrated in a lower section of FIG. 3, in the second step, contact between a bottom surface of the pallet 200 and a top surface of the cover 13 is caused, that is, the pallet 200 reaches a position where it is possible to apply the molten solder 20.

That is, in the second step, the soldering device 1 transfers from a waiting time period to an application time period. Additionally, in the second step, a hole part 200*a* of the pallet 200 and the hole part 13*a* of the cover 13 are joined, so that an inside of the pallet 200 and an inside of the cover 13 provide one joined space.

Then, in the second step, the control device 14 supplies, to the air cylinder 15, air with an air pressure that is less than a pressurizing force of the pallet 200 against the cover 13. Thereby, a pressing force (a reaction force) of the cover 13 against a pallet is less than a pressurizing force of the pallet, so that the cover 13 is pressurized by the pallet 200 and lowering thereof is started. Furthermore, the cover 13 is pressed against the pallet 200 by an air pressure of the air cylinder 15, so that the cover 13 maintains a state where it contacts the pallet 200, and is lowered. Thus, the cover 13 is pressed against the pallet 200, so that it is possible to prevent an inert gas that fills the cover 13 and the pallet 200 from escaping therefrom.

Furthermore, in the second step, the control device 14 reduces an amount of an inert gas that is supplied to the inside 130 of the cover 13 relative to that of the first step. That is, the control device 14 reduces an amount of an inert gas that is supplied for an application time period relative to a supplied amount for a waiting time period.

Thereby, it is possible to prevent a temperature drop at a time of soldering in a subsequent third step and fourth step and it is possible to prevent the molten solder 20 from not readily being jetted from the jet nozzle 12.

Third Step

Transfer to a third step is executed. As illustrated in an upper section of FIG. 4, in the third step, the cover 13 is lowered to a lowering position by pressurization of the pallet 200 and lowering thereof is stopped. Additionally, the third step is an application time period for the soldering device 1.

From the second step to the third step, a tip of the jet nozzle 12 protrudes from the hole part 13*a* as the cover 13 is lowered, and is inserted into an inside of the pallet 200 through the hole part 200*a*. Furthermore, hole diameters of the hole part 13*a* of the cover 13 and the hole part 200*a* of the pallet 200 are designed so as to be greater than an outer diameter of the jet nozzle 12. Thereby, in a case where the jet nozzle 12 protrudes from the cover 13, contact between the jet nozzle 12 and the cover 13 is not caused, so that the inside 130 of the cover 13 is not provided in a closed state and it is possible to readily lower the pallet 200 and the cover 13. Furthermore, it is possible to cause an inert gas to flow from the cover 13 into the pallet 200 through a gap between the cover 13 and the jet nozzle 12.

Furthermore, from the second step to the third step, an inert gas that fills the inside 130 of the cover 13 flows into an inside of the pallet 200. Furthermore, a non-illustrated vent hole is provided on a top surface of the pallet 200, and as an inert gas flows into an inside of the pallet 200, air that includes oxygen is pushed out from the vent hole to an outside. Thereby, air inside the pallet 200 is released to an outside and is replaced by an inert gas, so that an inside of the pallet 200 is provided in a low-oxygen state.

That is, a tip of the jet nozzle 12 is kept in a low-oxygen state even for an application time period, so that it is possible to reduce oxidation of the molten solder 20 that is jetted. Furthermore, an inside of the pallet 200 is provided in a low-oxygen state, so that it is possible to finish soldering on a side of a component surface of the printed circuit board 100 well. Furthermore, an inside of the pallet 200 and the inside 130 of the cover 13 are not provided in a closed state by a vent hole that is provided on a top surface of the pallet 200, so that it is possible to readily move the pallet 200 and the cover 13 downward and further it is possible to readily separate the pallet 200 and the cover 13 after application of a solder or the like.

Fourth Step

Transfer to a fourth step is executed. As illustrated in a lower section of FIG. 4, in the fourth step, the cover 13 is fixed at a lowering position and soldering on the printed circuit board 100 is executed. Additionally, the fourth step is an application time period for the soldering device 1.

Fifth Step

Transfer to a fifth step is executed. As illustrated in an upper section of FIG. 5, in the fifth step, soldering on the printed circuit board 100 is ended and raising of the pallet 200 and the cover 13 is started. That is, in the fifth step, the soldering device 1 transfers from an application time period to a waiting time period.

In the fifth step, the control device 14 supplies, to the air cylinder 15, air with an air pressure that is greater than a pressurizing force of a pallet against the cover 13. Thereby, a pressing force (a reaction force) of the cover 13 against a pallet is greater than a pressurizing force of the pallet, so that the cover 13 pressurizes the pallet and raising thereof is started.

Furthermore, an inside of the pallet 200 is filled with an inert gas, so that, while a low-oxygen state is kept, the cover 13 is raised and thereby it is possible to execute cutting of a solder. Therefore, a viscosity of a solder is less than a surface tension of the solder, so that it is possible to reduce generation of an icicle or a bridge.

Sixth Step

Transfer to a sixth step is executed. As illustrated in a lower section of FIG. 5, in the sixth step, the cover 13 is raised to a raising position and subsequently raising thereof is stopped. Specifically, raising of the cover 13 is stopped in a state where the jet nozzle 12 is housed in the inside 130.

That is, for a waiting time period that is the sixth step, the cover 13 is raised until the jet nozzle 12 is housed in the inside 130. Then, after raising of the cover 13 is stopped, the pallet 200 is separated from the cover 13 and conveyance thereof to another place is started.

Furthermore, after raising of the cover 13 is stopped, the control device 14 increases an amount of an inert gas that is supplied to the inside 130 of the cover 13 at a timing when the pallet 200 separates from the cover 13. Specifically, the control device 14 returns a supplied amount to that of the first step. Thereby, the inside 130 of the cover 13 is kept in a positive pressure state.

Thus, soldering is executed on the printed circuit board 100 from the first step to the sixth step.

As has been described above, a soldering device 1 according to an embodiment includes a jet nozzle 12 and a cover 13. The jet nozzle 12 jets a melted solder (a molten solder 20). The cover 13 is filled with an inert gas in an inside 130 thereof and has a hole part 13a at a position that corresponds to the jet nozzle 12. The cover 13 causes the jet nozzle 12 to protrude from the hole part 13a for an application time period when the molten solder 20 is applied to an application target (a printed circuit board 100) and houses the jet nozzle 12 in the inside 130 for a waiting time period other than the application time period. Thereby, it is possible to reduce oxidation of the molten solder 20.

Next, a physical configuration of a jet nozzle 12 that is included in a soldering device 1 according to an embodiment will be explained by using FIG. 6 to FIG. 10.

Figure 6:
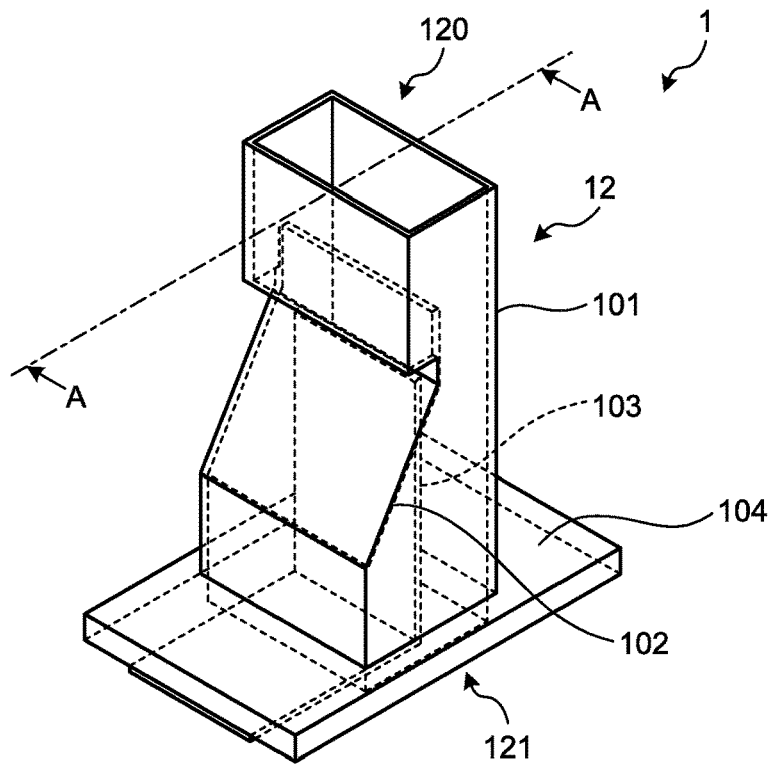
FIG. 6 is a diagram that illustrates a configuration of a jet nozzle that is included in a soldering device according to an embodiment.
Figure 7:
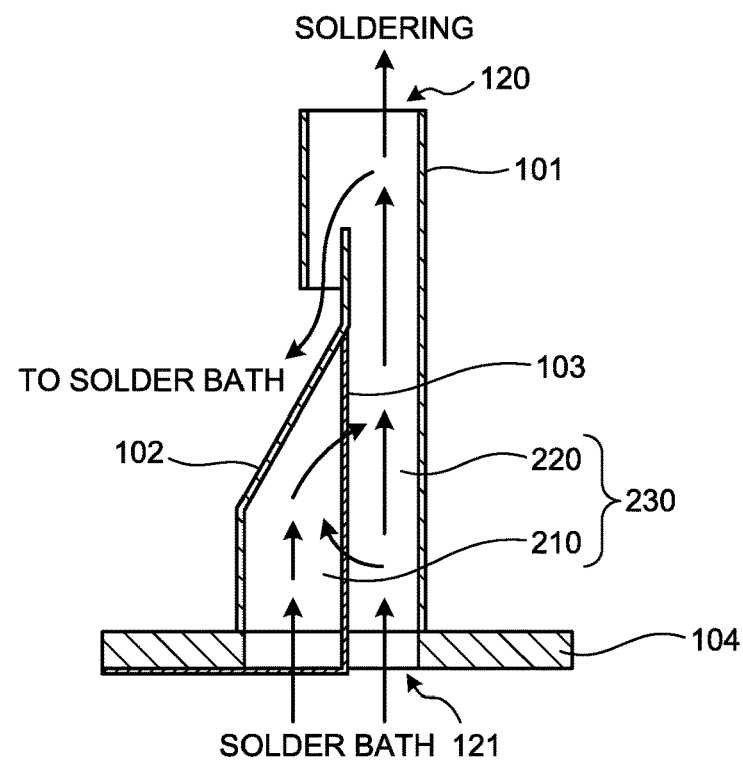
FIG. 7 is a diagram that illustrates a configuration of a jet nozzle that is included in a soldering device according to an embodiment.

FIG. 6 and FIG. 7 are diagrams that illustrate a configuration of the jet nozzle 12 that is included in the soldering device 1 according to an embodiment. FIG. 6 illustrates a perspective view that illustrates an appearance of the jet nozzle 12. Furthermore, FIG. 7 illustrates a cross-sectional view where a cross section provided by cutting a dashed-dotted line in FIG. 6 in a perpendicular direction (an upward or downward direction on a plane of paper) is viewed in a direction of A.

Additionally, although FIG. 6 and FIG. 7 illustrate only the jet nozzle 12 that is included in the soldering device 1, the soldering device 1 also includes a solder bath 10 that stores a molten solder, a pump for pressure-feeding a solder from the solder bath 10 to the jet nozzle 12, a heater that warms and melts a solder, and the like. Additionally, a configuration of the jet nozzle 12 will specifically be explained below.

As illustrated in FIG. 6 and FIG. 7, the jet nozzle 12 is a pipe member with a substantially rectangular shape and has an ejection port 120 where a solder is jetted and an inflow port 121 where a solder is flown from a solder bath. Additionally, although the ejection port 120 and the inflow port 121 are of substantially rectangular shapes in the present embodiment, opening shapes of the ejection port 120 and the inflow port 121 are not limited to rectangular shapes and may be arbitrary shapes such as circular shapes, triangular shapes, L-shapes, or V-shapes.

Furthermore, as illustrated in FIG. 6 and FIG. 7, the jet nozzle 12 has a peripheral part 101 that composes an appearance shape that is a rectangular shape and a base part 104 that is connected to a non-illustrated solder bath. Furthermore, the peripheral part 101 has a tapered site 102 (that will be described as a taper part 102 below).

Specifically, the taper part 102 is a site that is provided at a position that corresponds to one side of the jet nozzle 12 that is of a rectangular shape in a top view and formed in such a manner that an internal space 230 (see FIG. 7) is tapered from a proximal end to a distal end of the jet nozzle 12.

Additionally, although a case where the taper part 102 is provided only at a position that corresponds to one side of the jet nozzle 12 that is of a rectangular shape in a top view is illustrated in the present embodiment, it may be provided at positions that correspond to two or more sides of the jet nozzle 12 that is of a rectangular shape in a top view.

Furthermore, as illustrated in FIG. 7, a part of the jet nozzle 12 near the ejection port 120 is provided as a double pipe structure and configured in such a manner that a solder that is not provided for soldering but is returned passes through an inside of the double pipe structure and is returned to a solder bath along an outside of the taper part 102. Additionally, a size of the ejection port 120 is a size not to bias jetting of a solder, that is, not to deteriorate a straight traveling property of a solder.

Herein, a flow of a solder will be explained by using FIG. 7. As illustrated in FIG. 7, as a solder is pressure-fed from a solder bath by a non-illustrated pump, it flows from the inflow port 121 of the jet nozzle 12 into the internal space 230.

Herein, the inflow port 121 of the jet nozzle 12 is broader than the ejection port 120 by the taper part 102, so that a temperature of a solder that passes through an inside of the jet nozzle 12 is not readily lowered. That is, the taper part 102 broadens the internal space 230, so that it is possible to prevent a temperature drop of a solder.

Then, a solder that is flown into the internal space 230 is pushed up in a direction of the ejection port 120 of the jet nozzle 12 and jetted from the ejection port 120, so that soldering is executed on a circuit board. Furthermore, a solder that is not provided for soldering on a circuit board is returned to a solder bath along an outside of the taper part 102. That is, the taper part 102 also serves as a buffer material as a solder is returned to a solder bath and prevents splash of a returned solder.

Herein, the ejection port 120 of the jet nozzle 12 is constantly exposed to atmospheric air, so that an oxide film may be produced on a solder surface near the ejection port 120. Hence, a method that is referred to as flushing is executed where a momentum of a jet is increased to eliminate an oxide film.

However, in a case where flushing is executed on a jet nozzle that has a taper part in a conventional soldering device, a flow of a solder may be biased so that it may be impossible to eliminate an oxide film at high accuracy.

Specifically, a solder that passes near a taper part among a solder that passes through an internal space flows along a taper shape in flushing, so that a flow rate thereof is less than that of a solder that passes linearly at a position that is away from the taper part.

Then, solders with different flow rates simultaneously flow in an internal space and thereby a solder is not linearly jetted at an ejection port, so that a site where it is not possible to eliminate an oxide film is produced.

Hence, in the soldering device 1 according to an embodiment, a flow adjustment plate (a plate member 103) that adjusts a flow of a solder is provided in the internal space 230 of the jet nozzle 12.

Specifically, the soldering device 1 according to an embodiment includes the plate member 103 that partitions the internal space 230 that is tapered by the taper part 102 into a first space 210 that corresponds to a tapered site (the taper part 102) and a second space 220 that corresponds to a size of the ejection port 120 on the jet nozzle 12. A tip of the ejection port 120 is provided as a double pipe structure and the second space 220 is identical to a size of an inner pipe (in a top view) in the ejection port 120 with a double pipe structure, although a detail thereof will be described later.

In other words, the plate member 103 partitions the internal space 230 into the first space 210 and the second space 220 where flow rates of a solder therein are different. Thereby, solders that flow in the first space 210 and the second space 220 are not mixed in the internal space 230, so that a flow of a solder that linearly flows in the second space 220 is not readily disturbed.

Therefore, a solder that linearly passes through the second space 220 is jetted linearly without biasing a flow thereof at the ejection port 120, so that it is possible to eliminate, at high accuracy, an oxide film that is generated at the ejection port 120.

Additionally, gaps are formed at left and right ends of the plate member 103 and the first space and the second space 220 are joined through such gaps. That is, a solder that passes through the first space 210 moves to the second space 220 through such gaps and is finally jetted from the ejection port 120, so that a solder is not retained in the first space 210.

Furthermore, an amount of a solder that moves from the first space 210 to the second space 220 is low, so that a flow of a solder that linearly flows in the second space 220 is not readily interrupted. Such a point will be explained by using FIG. 8.

Figure 8:
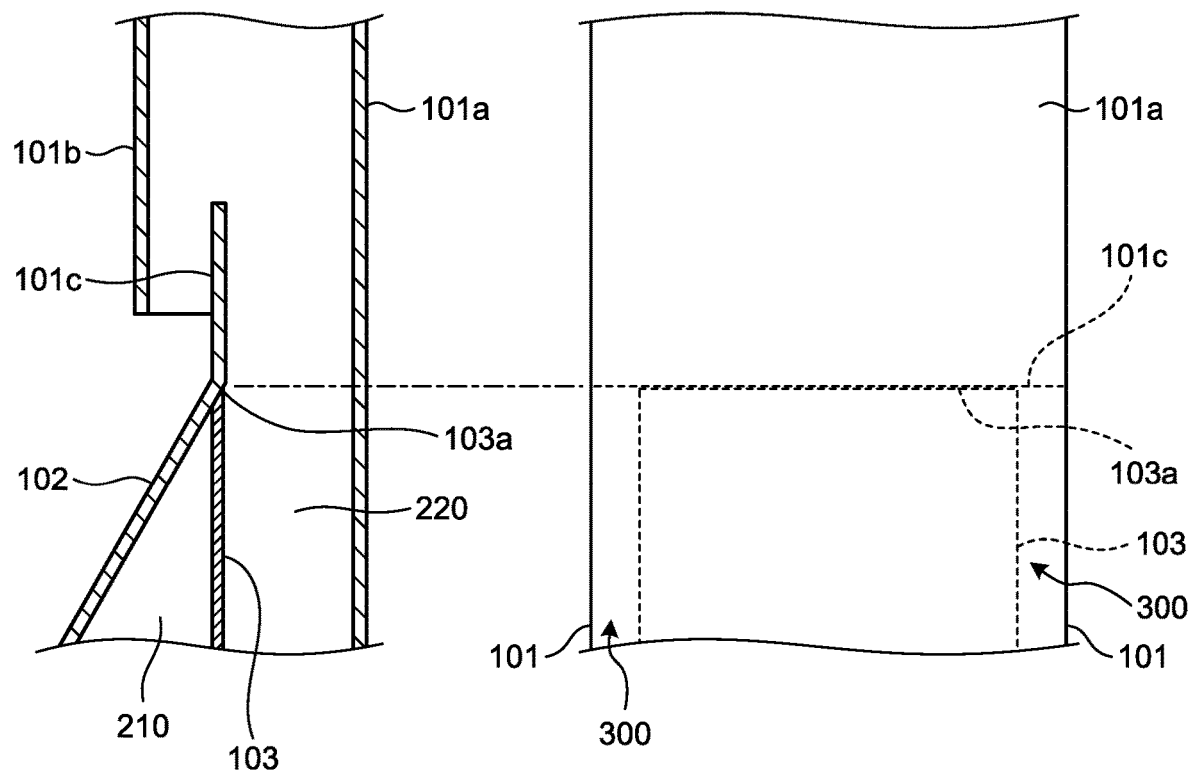
FIG. 8 is a side view of a jet nozzle according to an embodiment.

FIG. 8 is a side view of a jet nozzle 12 according to an embodiment. A left view in FIG. 8 illustrates a part of the cross-sectional view as illustrated in FIG. 7 and a right view in FIG. 8 is a side view that is viewed while a side surface of a peripheral part 101 on an opposite side of a taper part 102 is provided as a front side.

As illustrated in a left view in FIG. 8, a double pipe structure is provided near an ejection port 120 of the jet nozzle 12. Specifically, in a double pipe structure of the jet nozzle 12, an outside pipe (an outer pipe) is formed by a peripheral part 101a and a peripheral part 101b and an inside pipe (an inner pipe) is formed by the peripheral part 101a and a peripheral part 101c.

An outer pipe that is formed by the peripheral part 101a and the peripheral part 101b is a site for preventing a solder that is jetted at a time of soldering from jumping to an outside. Furthermore, an inside pipe (an inner pipe) that is formed by the peripheral part 101a and the peripheral part 101c functions as a guide part for returning a solder that is not provided for soldering to a solder bath.

Specifically, the peripheral part 101c is joined to the taper part 102, and thereby, it passes between the peripheral part 101c and the peripheral part 101b, flows into an outside of the taper part 102, and finally, is returned to a solder bath.

Furthermore, as illustrated in a left view of FIG. 8, a plate member 103 straight extends in an extension direction of the jet nozzle 12 (an extension direction of the peripheral part 101c) from a position of joining of the taper part 102 and the peripheral part 101c.

In other words, the plate member 103 is provided at a position where a size (a surface area) of a second space 220 in a top view is identical to a size of an inner pipe (an opening that is formed by the peripheral part 101a and the peripheral part 101c) in a top view.

Thereby, it is possible to jet a solder that passes through the second space 220 without a loss thereof and it is possible to prevent turbulence from being caused as it moves from the second space 220 to an ejection port 120. That is, it is possible to jet a solder linearly without a loss thereof.

Furthermore, as illustrated in a left view and a right view of FIG. 8, an end part 103a of the plate member 103 on a side of the ejection port 120 contacts the jet nozzle 12 (the peripheral part 101c). Thereby, it is possible to stop, at the end part 103a, a flow of a solder with a maximum momentum (a high flow rate) in a first space 210.

That is, in a state where a solder with a maximum momentum keeps a high flow rate, it moves from the first space 210 to the second space 220, so that it is possible to reduce degradation of a straight traveling property of a solder.

Additionally, the end part 103a of the plate member 103 does not have to contact the jet nozzle 12 (the peripheral part 101c) as long as it is possible to stop a flow of a solder that passes through the first space 210.

Furthermore, as illustrated in a left view of FIG. 8, a position of contact between the plate member 103 and the jet nozzle 12 is an end part of the taper part 102 on a side of the ejection port 120. Thereby, it is possible for a solder that passes through the second space 220 to flow to the ejection port 120 smoothly. That is, it is possible to prevent degradation of a straight traveling property of a solder that passes through the second space 220.

Furthermore, as illustrated in a right view of FIG. 8, gaps 300 are opened between left and right ends of the plate member 103 and the peripheral part 101. In other words, a length of the plate member 103 in a width direction that is orthogonal to a height direction is less than a length of the peripheral part 101a in a width direction.

That is, both ends of the plate member 103 in a width direction that is orthogonal to a height direction of the jet nozzle 12 separates from the jet nozzle 12 (the peripheral part 101a). Thereby, it is possible to prevent a solder that flows into the first space 210 from being retained in the first space 210.

Additionally, an amount of a solder that moves from the first space 210 to the second space 220 through the gaps 300 is low, so that, even if a solder moves from the first space 210 to the second space 220, it is possible to reduce, to a minimum, interruption of a flow of a solder that linearly flows in the second space 220.

Figure 9:
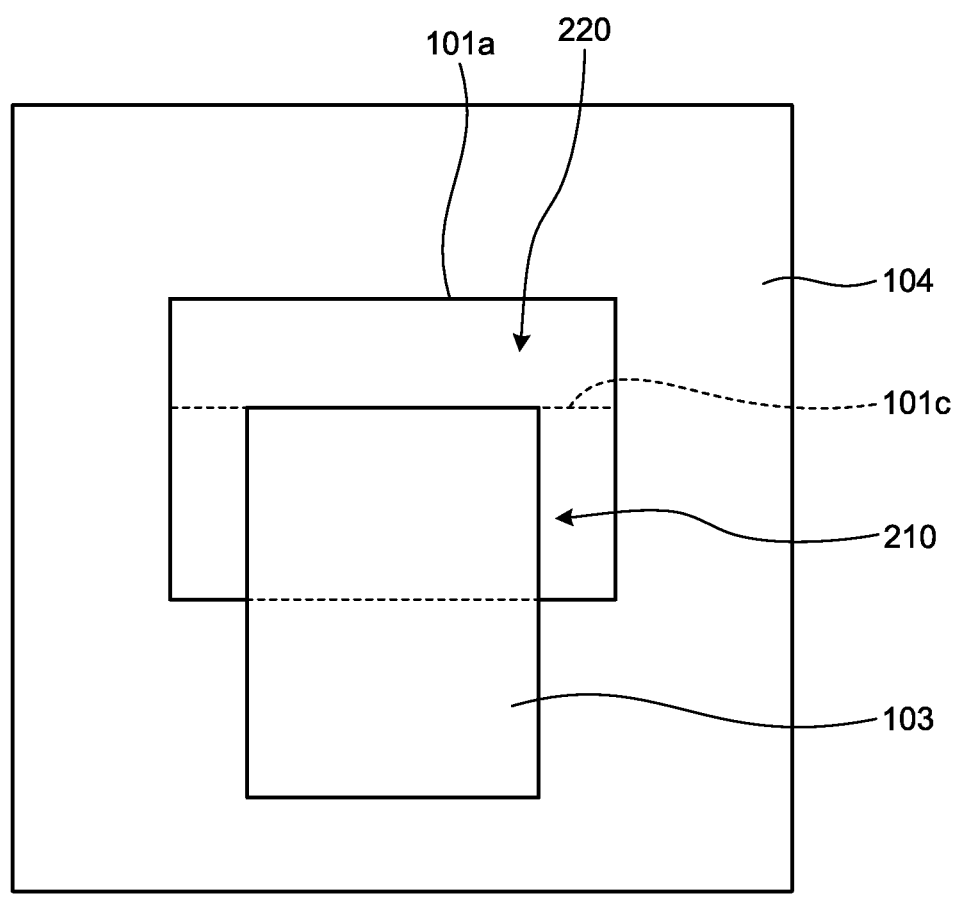
FIG. 9 is a bottom view of a jet nozzle according to an embodiment.

Next, a bottom surface of a jet nozzle 12 will be explained by using FIG. 9. FIG. 9 is a diagram that illustrates a bottom view of the jet nozzle 12 according to an embodiment. As illustrated in FIG. 9, an inflow port 121 of the jet nozzle 12 is of a substantially rectangular shape if it is not plugged with a plate member 103.

If the inflow port 121 of the jet nozzle 12 is of a rectangular shape, an amount of a solder that flows into a first space 210 is increased, so that a solder that is not capable of moving from the first space 210 to a second space 220 through gaps 300 as described above is retained.

Hence, as illustrated in FIG. 9, the plate member 103 partially plugs an opening that corresponds to the first space 210 in the inflow port 121 of the jet nozzle 12. Specifically, the plate member 103 extends from an end part of a taper part 102 to the inflow port 121, bends to a side of the first space 210, and plugs a part of the inflow port 121.

More specifically, the plate member 103 plugs a part of an opening that corresponds to the first space 210 and does not plug an opening that corresponds to the second space 220 so that the inflow port 121 is of a U-shape in a bottom view.

Thereby, it is possible to reduce an amount of a solder that flows into the first space 210 without reducing an amount of a solder that flows into the second space 220, so that it is possible to reduce retention of a solder in the first space 210.

Moreover, the plate member 103 protrudes from a side of the first space 210 to a side of a base part 104 relative to the inflow port 121 in a bottom view. That is, the plate member 103 is configured as a member with an L-shape. Thereby, for example, it is possible to readily fix the plate member 103 on the base part 104 or the like.

As described above, a soldering device 1 according to an embodiment includes a jet nozzle 12 and a plate member 103. The jet nozzle 12 has a tapered peripheral part 101 where a part of an internal space 230 where a solder passes is tapered toward a tip thereof. The plate member 103 partitions the tapered internal space 230 into a first space 210 that corresponds to a tapered site 102 and a second space 220 that corresponds to a size of an ejection port 120 on the jet nozzle 12. Thereby, it is possible to eliminate, at high accuracy, an oxide film that is produced at the ejection port 120 of the jet nozzle 12.

Additionally, although a case where the plate member 103 is configured as a member with an L-shape is illustrated in the above, this is not limiting. Another example of the plate member 103 will be explained by using FIG. 10.

Figure 10:
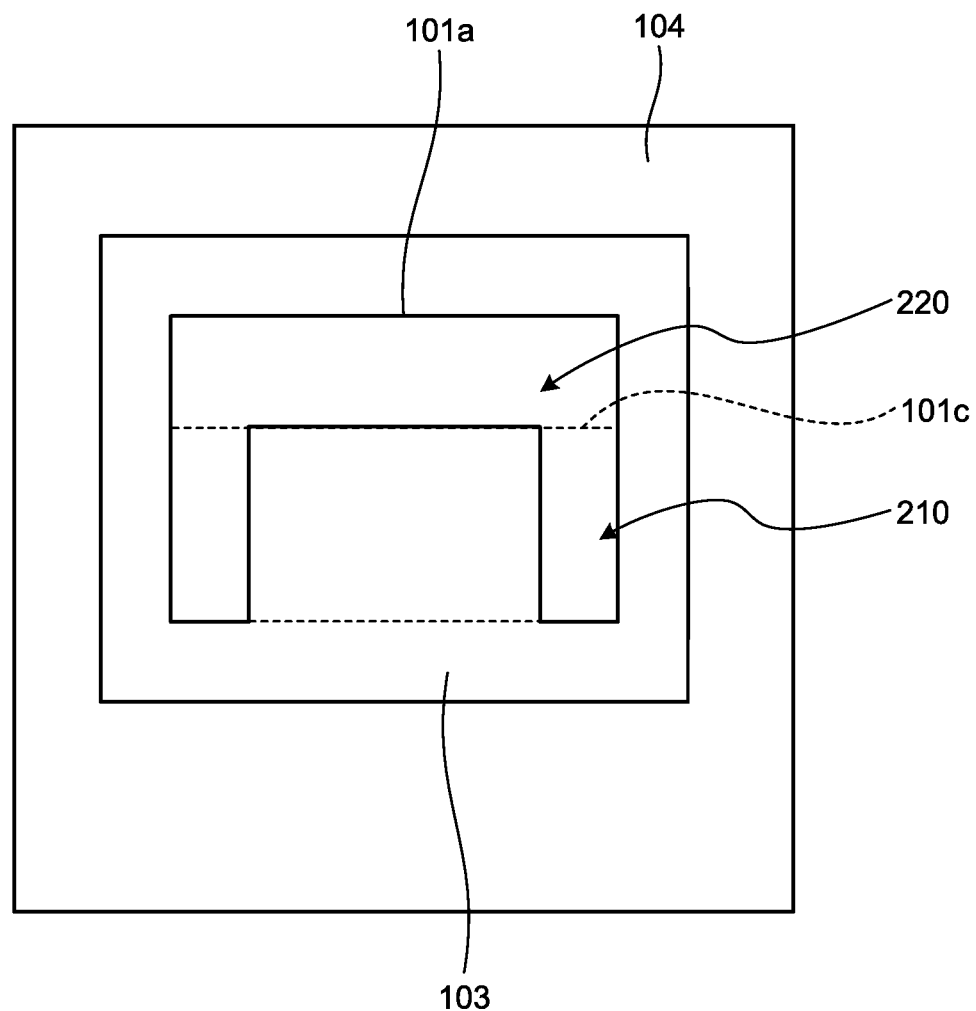
FIG. 10 is a bottom view of a jet nozzle according to a variation.

FIG. 10 is a bottom view of a jet nozzle 12 according to a variation. As illustrated in FIG. 10, a plate member 103 partially plugs an opening that corresponds to a first space 210 in an inflow port 121 of the jet nozzle 12, similarly to FIG. 9.

Then, in FIG. 10, the plate member 103 is formed so as to surround the inflow port 121 of the jet nozzle 12, differently from FIG. 9. Specifically, the plate member 103 is joined to a site that surrounds four sides of the inflow port 121 with a rectangular shape in a bottom view and plugs the inflow port 121 that corresponds to the first space 210.

Then, the plate member 103 fixes, on a base part 104, a site that surrounds four sides of the inflow port 121. Thereby, it is possible to fix the plate member 103 on the base part 104 tightly.

According to an aspect of an embodiment, it is possible to reduce oxidation of a solder.

It is possible for a person skilled in the art to readily derive a further effect(s) or variation(s). Accordingly, a broader aspect of the present invention is not limited to a specific detail(s) and a representative embodiment(s) as illustrated and described above. Therefore, various modifications are possible without departing from the spirit or scope of a general inventive concept as defined by the appended claims and equivalents thereof.

What is claimed is:

1. A soldering device, comprising:
a jet nozzle that jets a molten solder;
a cover that is filled with an inert gas in an inside thereof and has a hole part at a position that corresponds to the jet nozzle; and
a pressing part that presses the cover, wherein:
the cover causes the jet nozzle to protrude from the hole part for an application time period when the solder is applied to an application target and houses the jet nozzle in the inside of the cover for a waiting time period other than the application time period;
for the application time period, (i) the cover contacts a conveyance body that houses the application target in an inside thereof and (ii) the inside of the conveyance body and the inside of the cover are joined so that the inert gas that fills the inside of the cover flows into the inside of the conveyance body and thereby the application target that is housed in the inside of the conveyance body is surrounded by the inert gas that fills the inside of the conveyance body; and
during a time in the application time period in which the cover is moved by pressure of the conveyance body, the pressing part presses the cover against the conveyance body.

2. The soldering device according to claim 1, wherein the pressing part is an air cylinder.

3. A soldering device, comprising:
a jet nozzle that jets a molten solder;
a cover that is filled with an inert gas in an inside thereof and has a hole part at a position that corresponds to the jet nozzle; and
a pressing part that presses the cover, wherein:
the cover causes the jet nozzle to protrude from the hole part for an application time period when the solder is applied to an application target and houses the jet nozzle in the inside of the cover for a waiting time period other than the application time period;
for the application time period, (i) the cover contacts a conveyance body that houses the application target in an inside thereof and (ii) the inside of the conveyance body and the inside of the cover are joined so that the application target that is housed in the inside of the conveyance body is surrounded by the inert gas that fills the inside of the conveyance body;
the inside of the cover is put into a positive pressure state by the inert gas for the waiting time period so as to provide an opening state without providing an opening and closing mechanism for the hole part; and
during a time in the application time period in which the cover is moved by pressure of the conveyance body, the pressing part presses the cover against the conveyance body.

4. The soldering device according to claim 3, wherein the pressing part is an air cylinder.

\* \* \* \* \*